(12) United States Patent
Bishop et al.

(10) Patent No.: US 7,779,234 B2
(45) Date of Patent: Aug. 17, 2010

(54) SYSTEM AND METHOD FOR IMPLEMENTING A HARDWARE-SUPPORTED THREAD ASSIST UNDER LOAD LOOKAHEAD MECHANISM FOR A MICROPROCESSOR

(75) Inventors: James W. Bishop, Endwell, NY (US); Hung Q. Le, Austin, TX (US); Dung Q. Nguyen, Austin, TX (US); Wolfram Sauer, Austin, TX (US); Benjamin W. Stolt, Austin, TX (US); Michael T. Vaden, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 364 days.

(21) Appl. No.: 11/877,391

(22) Filed: Oct. 23, 2007

(65) Prior Publication Data

US 2009/0106538 A1    Apr. 23, 2009

(51) Int. Cl.
*G06F 9/38* (2006.01)
(52) U.S. Cl. .................................................... 712/207
(58) Field of Classification Search .................. 712/207
See application file for complete search history.

(56) References Cited

U.S. PATENT DOCUMENTS

| 6,018,759 | A | 1/2000 | Doing et al. | |
|---|---|---|---|---|
| 6,216,220 | B1 | 4/2001 | Hwang | |
| 6,311,266 | B1 | 10/2001 | Smith et al. | |
| 6,567,839 | B1 | 5/2003 | Borkenhagen et al. | |
| 7,343,602 | B2 * | 3/2008 | Luk et al. | 718/100 |
| 7,496,732 | B2 * | 2/2009 | Kottapalli et al. | 712/207 |
| 7,502,910 | B2 * | 3/2009 | Damron | 712/34 |
| 7,594,096 | B2 * | 9/2009 | Eickemeyer et al. | 712/207 |
| 2003/0023834 | A1 | 1/2003 | Kalafatis et al. | |
| 2004/0133769 | A1 * | 7/2004 | Chaudhry et al. | 712/233 |
| 2005/0060518 | A1 | 3/2005 | Augsburg et al. | |
| 2006/0224860 | A1 * | 10/2006 | Colavin et al. | 712/207 |

OTHER PUBLICATIONS

Wallace et al., Threaded multiple path execution, Computer Architecture, 1998. Proceedings. The 25th Annual International Symposium on, Publication Date: Jun. 27-Jul. 1, 1998, pp. 238-249.*
Petric et al., "Three extensions to register integration", Microarchitecture, 2002. (MICRO-35). Proceedings. 35th Annual IEEE/ACM International Symposium on (Nov. 18-22, 2002), pp. 37-47.*
Roth et al., Speculative data-driven multithreading, High-Performance Computer Architecture, 2001. HPCA. The Seventh International Symposium on, Publication Date: Jan. 19-24, 2001, pp. 37-48.*
Steffen et al., The potential for using thread-level data speculation to facilitate automatic parallelization, High-Performance Computer Architecture, 1998. Proceedings., 1998 Fourth International Symposium on, Feb. 1-4, 1998, pp. 2-13.*

* cited by examiner

*Primary Examiner*—William M Treat
(74) *Attorney, Agent, or Firm*—Dillon & Yudell LLP

(57) ABSTRACT

The present invention includes a system and method for implementing a hardware-supported thread assist under load lookahead mechanism for a microprocessor. According to an embodiment of the present invention, hardware thread-assist mode can be activated when one thread of the microprocessor is in a sleep mode. When load lookahead mode is activated, the fixed point unit copies the content of one or more architected facilities from an active thread to corresponding architected facilities in the first inactive thread. The load-store unit performs at least one speculative load in load lookahead mode and writes the results of the at least one speculative load to a duplicated architected facility in the first inactive thread.

18 Claims, 11 Drawing Sheets

| Dirty Vector | Architected Registers |
|---|---|
| 0 | 0 |
| 1 | 1 |
| 2 | 2 |
| 3 | 3 |
| 4 | 4 |
| 5 | 5 |
| 6 | 6 |
| 7 | 7 |
| 8 | 8 |
| 9 | 9 |
| 10 | 10 |
| 11 | 11 |
| 12 | 12 |
| 13 | 13 |
| 14 | 14 |
| 15 | 15 |
| 16 | 16 — 132 |
| ⋮ — 119 | ⋮ |
| 31 | 31 |

*Fig. 2*

| A | B | C | A | B | C | D | MT | S |

| OPCD | RT | R_A | R_B | D | DL | DL | MT | S |

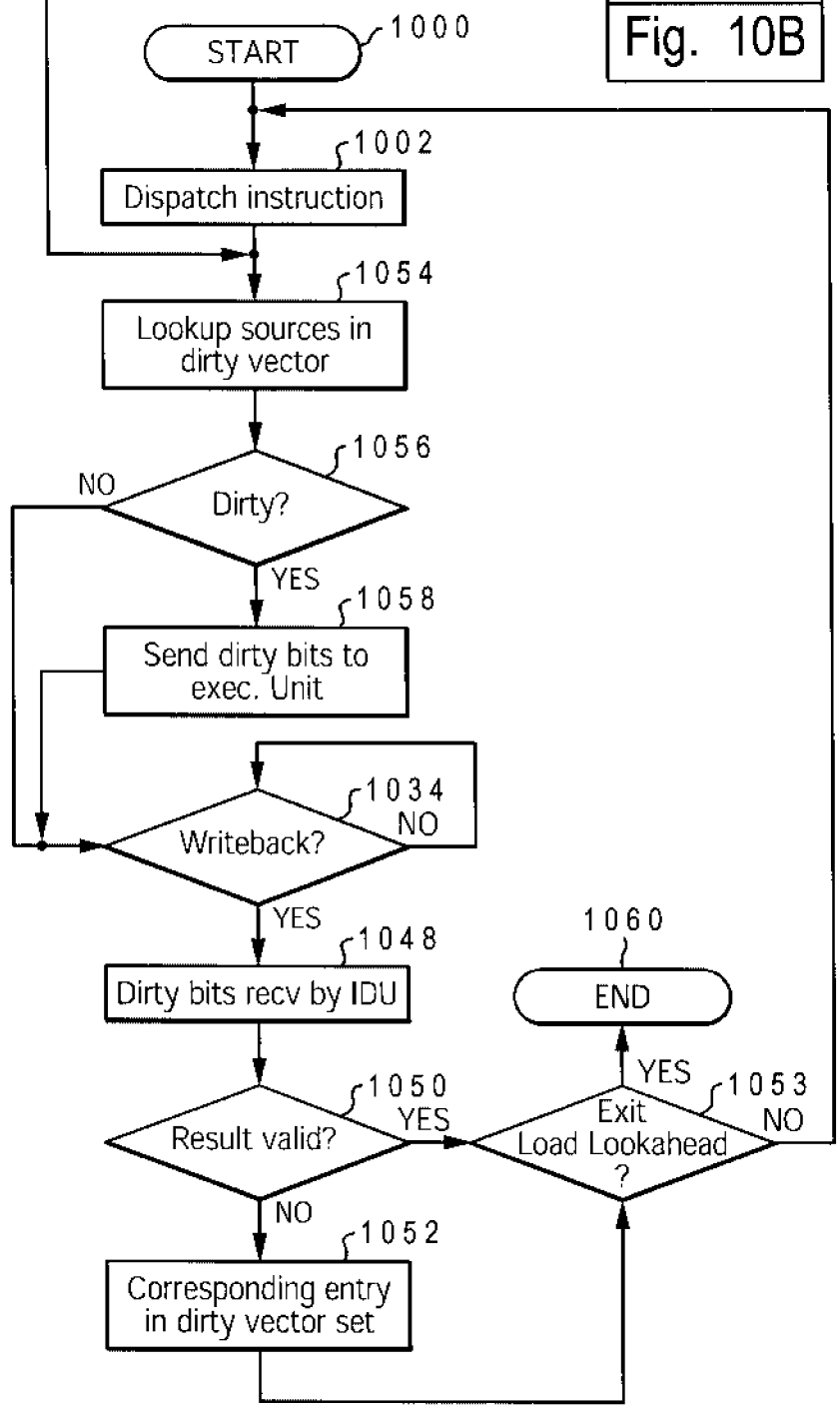

SYSTEM AND METHOD FOR IMPLEMENTING A HARDWARE-SUPPORTED THREAD ASSIST UNDER LOAD LOOKAHEAD MECHANISM FOR A MICROPROCESSOR

BACKGROUND OF THE INVENTION

1. Technical Field

The present invention relates in general to the field of data processing systems, and more particularly, the field of enhancing performance of data processing systems.

2. Description of the Related Art

There is a desire by computer users to maximize performance of microprocessors and a corresponding pressure on the computer industry to increase the computing power and efficiency of microprocessors. This desire is especially evident in the server computer field where entire businesses are dependent on their computer infrastructure to carry out and monitor day to day activities that affect revenue, and the like. Increased microprocessor performance will provide additional resources for computer users while providing a mechanism for computer manufacturers to distinguish themselves from the competition.

Over the years, state-of-the-art microprocessors have evolved from fairly simple systems to extremely complex integrated circuits with millions of transistors on a single silicon substrate. Early microprocessors were only able to execute one instruction per cycle. Today, "superscalar" microprocessors are able to execute more than one instruction per cycle.

As known in the art, certain situations result in instruction stalls where instruction execution is limited or halted until the situation is resolved. An example of such a situation is a cache miss that occurs when data required by an instruction is not available in level one (L1) cache and the microprocessor is forced to wait until the data can be retrieved from a slower cache or main memory. Obtaining data from main memory is a relatively slow operation, and when out-of-order execution is limited due to aforementioned complexities, subsequent instructions cannot be fully executed until valid data is received from memory.

More particularly, an older instruction that takes a long time to execute can create a stall that may prevent any subsequent instructions from executing until the time-consuming instruction completes. For example, in the case of a load instruction that requires access to data not in the L1 cache (cache miss), a prolonged stall can occur while data is fetched from a slower cache, or main memory. Without facilities to support all out-of-order execution scenarios, instruction order may not be changed such that forward progress through the instruction stream can be made while the missed data is retrieved.

In the Power6™ processor, a product of International Business Machines of Armonk, N.Y., the fixed point, load/store, and branch instructions are executed in-order with respect to each other. Therefore, when a load encounters a cache miss, subsequent instructions are stalled while waiting for the missed request to complete.

To overlap cache misses, a feature called load lookahead (LLA) execution is implemented in Power6™. Under LLA, when a load instruction cannot execute due to a translation or cache miss, subsequent instructions are allowed to execute if the subsequent instructions do not (directly or indirectly) depend on the load instruction. The LLA mechanism enables Power6™ to generate multiple data fetch requests to the lower cache structure and to bring data required by the subsequent instructions into the L1 cache.

Results under LLA executions are not saved. The results are available when the instructions execute and while they are being staged through the execution unit before the write back stage. While the instructions are being staged, the results can be forwarded to subsequent instructions, if necessary. When the result is passing through the write-back stage, the general-purpose register (GPR) location being set by the instruction under LLA is marked as "dirty", because the results are discarded. Subsequent instructions utilizing the facility beyond the write-back stage cannot rely on the data since the architected location (e.g., GPR) was not updated by the older instruction.

Therefore, there is a need for a system and method for enabling subsequent instructions to utilize the results of the LLA executions beyond the write-back stage to address the aforementioned limitations of the prior art.

SUMMARY OF THE INVENTION

The present invention includes a system and method for implementing a hardware-supported thread assist under load lookahead mechanism for a microprocessor. According to an embodiment of the present invention, hardware thread-assist mode can be activated when one thread of the microprocessor is in a sleep mode. When load lookahead mode is activated, the fixed point unit copies the content of one or more architected facilities from an active thread to corresponding architected facilities in the first inactive thread. The load-store unit performs at least one speculative load in load lookahead mode and writes the results of the at least one speculative load to a duplicated architected facility in the first inactive thread.

The above, as well as additional purposes, features, and advantages of the present invention will become apparent in the following detailed written description.

BRIEF DESCRIPTION OF THE FIGURES

The novel features believed characteristic of the invention are set forth in the appended claims. The invention itself as well as a preferred mode of use, further purposes and advantages thereof will best be understood by reference to the following detailed description of an illustrative embodiment when read in conjunction with the accompanying figures, wherein:

FIG. 2 is a representation of a dirty bit vector according to an embodiment of the present invention;

FIG. 3 is a representation of dependency on load (DL) bits according to an embodiment of the present invention;

FIG. 4A is a representative microprocessor instruction showing the opcodes, source and destination register identification bits, dirty bit, and DL bits in accordance with an embodiment of the present invention;

DETAILED DESCRIPTION OF A PREFERRED EMBODIMENT

The present invention includes a system and method for implementing a hardware-supported thread assist under load lookahead mechanism for a microprocessor. According to an embodiment of the present invention, hardware thread-assist mode can be activated when one thread of the microprocessor is in a sleep mode. When load lookahead mode is activated, the fixed point unit copies the content of one or more architected facilities from an active thread to corresponding architected facilities in the first inactive thread. The load-store unit performs at least one speculative load in load lookahead mode and writes the results of the at least one speculative load to a duplicated architected facility in the first inactive thread.

Figure 1:
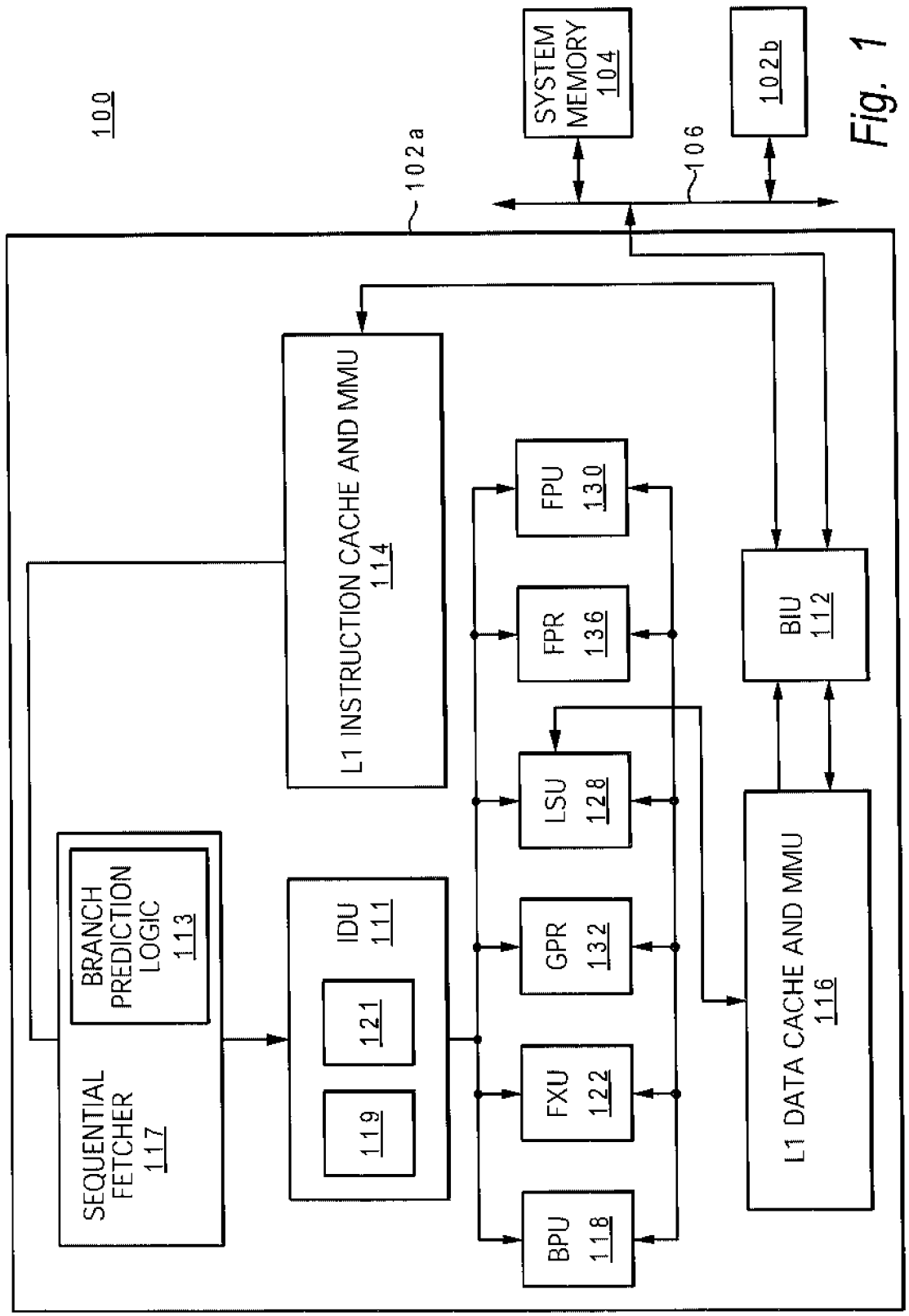
FIG. 1 is a block diagram illustrating an exemplary data processing system in which an embodiment of the present invention may be implemented.

Referring now to the figures, and in particular, referring to FIG. 1, there is illustrated an exemplary data processing system 100 in which a preferred embodiment of the present invention may be implemented. As illustrated, data processing system 100 includes microprocessors 102a-102b, which are coupled to a system memory 104 via a system interconnect 106. Those with skill in the art will appreciate that the present invention is in no way limited to two microprocessors, but any number of microprocessors may be implemented in data processing system 100.

System memory 104 provides storage for data and instructions that are provided to, or received from microprocessors 102a-102b via system interconnect 106. Data is then stored in L1 data cache and memory management unit (MMU) 116. As well-known in the art, L1 data cache and MMU 116 provide smaller, but higher speed storage for information being utilized by a microprocessor such as microprocessors 102a-102b. Bus interface unit (BIU) 112 enables communication between microprocessors 102a-102b and system interconnect 106.

In accordance with the present invention, instructions are retrieved in order by sequential fetcher 117 from L1 instruction cache and MMU 114 and provided to instruction dispatch unit (IDU) 111. Branch instructions are provided from sequential fetcher 117 to IDU 111, which sends the branch instructions to branch processing unit (BPU) 118. BPU 118 executes branch instructions that control the flow of the instruction stream by branching, or jumping, to another basic block of instructions. Conditional branch instructions evaluate a condition stored in a condition register and branch to another non-sequential instruction when the condition is satisfied and continue sequential instruction processing when the condition is not satisfied. Sequential fetcher 117 also includes branch prediction logic 113 that provides a prediction as to whether the branch will be taken or not, based on: (a) one or more hint bits, (b) the history of previously-executed branch instructions, or the like.

IDU 111 includes a 64 entry instruction buffer 121, which receives the fetched instructions from sequential fetcher 117. Instructions are stored in instruction buffer 121 while awaiting dispatch to the appropriate execution units. In an embodiment of the present invention, a dirty bit vector 119 in IDU 111 includes 32-bits, each bit corresponding to each of the 32 architected general purpose registers (GPRs) 132 in the microprocessor. It should be understood that a general purpose register having 32 entries is utilized merely as an example and should not be considered a limitation. Those skilled in the art will readily comprehend how general purpose registers (as well as other types of architected facilities such as floating point registers) of various sizes (e.g., 8, 16, 64, 128, and the like) are contemplated within the scope of the present invention.

The bits in dirty bit vector 119 will indicate which results in GPRs have valid or invalid results. In an embodiment of the present invention, a "0" will be set in a dirty bit vector for those registers having valid results and a "1" will be set in a dirty bit vector for those registers having invalid results. Dirty bit vector 119 will be described in more detail herein in conjunction with FIG. 3.

IDU 111 dispatches instructions to various execution units, such as a fixed point, or integer unit (FXU) 122 and floating point unit (FPU) 130. Both FXU 122 and FPU 130 are arithmetic/logic units that perform various functions, such as ADD, SUBTRACT, MULTIPLY, and DIVIDE. Basically, fixed point arithmetic differs from floating point arithmetic in that scientific notation is possible with floating point operations because the radix point is capable of being moved among the digits of the number. In contrast, fixed point arithmetic implicitly sets the radix at a particular place. Fixed point and floating point arithmetic is well-known to those skilled in the art and will not be discussed further herein.

Load store unit (LSU) 128 executes instructions that either load information (data and instructions) from memory to the microprocessor registers or store information from those registers into memory. GPRs 132 are associated with FXU 122 and floating point registers (FPRs) 136 are associated with FPU 130. These registers store the arithmetic and logical results from execution of the instructions by their respective execution units. As depicted, IDU 111 is coupled to all of the execution units and registers such that any type of instruction can be dispatched from IDU 111. Further, the output of the execution units 122, 128, and 130 are coupled to the general purpose registers (GPRs) 132 and floating point registers (FPRs) 136 such that the execution units can store results to the registers from executed instructions and then retrieve those results to be used in processing existing or future instructions. The elements shown in microprocessor 102a and described above can be considered to constitute the "core" of a microprocessor. Also, the present invention includes the utilization of microprocessors that may include multiple cores, which may include multiple execution units.

Referring to FIG. 2, dirty bit vector 119 is shown with its relationship to GPRs 132. Each of the 32 bits in vector 119 represent the values in the 32 GPRs 132 (i.e., Bits 0-31 in dirty bit vector 119 directly correspond to registers 0-31 in GPR 132. For purposes of explanation and not limitation, vector 119 is described herein as being associated with GPR 132. It should be understood that other embodiments of the present invention are contemplated in which a dirty bit vector is associated with FPRs 136. In the case of data processing systems that support multi-threaded processing, there is a corresponding dirty bit vector 119 and GPRs 132 for each thread.

FIG. 3 shows a set of bits that indicate the dependency of speculatively executing instructions relative to one another. These "dependency on delayed validation" bits can monitor various conditions such as the dependency by a current instruction on a prior instruction that moves data between registers within the microprocessor, or by an instruction that uses data written to a register by an I/O device. In an embodiment of the present invention, the "dependency on delayed validation" bits will monitor the dependency of a current instruction on the data retrieved by a load instruction. These "dependency on load" (DL) bits are used to track the time between when a load instruction returns the result and when the result is determined to be valid.

For purposes of simplifying the understanding of the present invention, the "dependency on load" (DL) bits will be used as one example of the "dependency on delayed validation" bits. However, it should be noted that other embodiments may have different or additional dependency bits to track the distance between the validation of other sources of data (beyond load instructions) and the dependent instruction.

The dependency on load example is used herein for the purposes of illustration only and not limitation. The DL bits are essentially a shift counter having a number of bit positions equal to the number of cycles between the time the load data is returned and when the validity of the data is subsequently determined.

In FIG. 3, reference numerals 150, 151 each represent three DL bits that correspond to first and second LSUs, respectively. Further, dirty bit vector 152 that is associated with the result being processed by the load instruction is a continuation of the dirty bit in dirty bit vector 119 that is associated with an architected register. This dirty bit "D" in the instruction is also determined, not only by the value in dirty bit vector 119, but also by various other inputs. These include the DL bits, a load reject, which is an indication of whether load data is valid, forwarded dirty bits from other instructions, and the like.

Further, with regard to FIG. 3, field 153 will be used in the case where multi-threading is implemented. That is, the processor will need to know which of the two (or more) threads is being executed in order to track the resources, i.e. context of each thread. This bit or an equivalent indicator will be present for all multithreaded implementation, regardless of whether the threads are capable of utilizing the load lookahead prefetch mechanism of the present invention. Finally, a speculative field 157 includes a tag bit that tells the processor whether the instruction is being executed speculatively, i.e. "S".

FIG. 4A is an illustration of an instruction capable of being implemented by a microprocessor that operates in accordance with the present invention. Reference numeral 156 is an opcode that defines the type of operation being performed, such as an ADD, COMPARE, LOAD, or the like. RT 155 is the target register where the results of the operation are stored. Registers $R_A$ 154 and $R_B$ 158 are two source registers having the operands that are to be manipulated in accordance with the opcode of the instruction. Speculative execution tag bit 157 is included to indicate whether the instruction is being speculatively executed and will not write its results back to the architected registers, or non-speculatively executed where write back is enabled. Dirty bit 152 and DL bits 150, 151, multithreaded bit 153, as well as speculative execution bit 157 have been described above with reference to FIG. 3.

Load lookahead prefetch is started whenever a load (or other instruction that takes a lot of cycles to execute) causes an extended stall condition such that the out of order facilities, if any, provided by the processor can not support further progress through the instruction stream. Once active, load lookahead prefetch accomplishes three things:

(1) allows the execution of instructions without changing the architected state of the machine;

(2) determines which loads are eligible to be prefetched; and (3) speculatively prefetches data into the L1 cache.

Once lookahead prefetch mode is activated, instructions that are not supported by the out-of-order execution mechanisms of the processor (if any), identified herein as "speculative instructions", are allowed to be written back to a copy of the architected registers of the microprocessors stored in an inactive thread. The copy of the architected registers and writeback are discussed in more detail in conjunction with FIG. 4B.

In any case, determining which loads are eligible for prefetching requires that instruction dependencies and the validity of results be tracked. This functionality is split into two parts. Execution units are responsible for dynamically tracking dependencies related to instructions in the execution pipeline using a set of "Dirty" (D) and "Dependency on Load" (DL) bits. For the purpose of example and not limitation, invalid or unavailable results, particularly for those speculative instructions that are no longer in the pipeline, are tracked in this preferred embodiment by IDU 111. Other embodiments may track invalid or unavailable architectural facilities in the execution units, or with the architectural facility.

Load lookahead prefetch continues until the initial stall condition is resolved. In the case of a load causing a cache miss, this could be a signal indicating that the load data is now available. When this occurs, normal non-speculative execution will restart at the stalled instruction. Any information about speculative result validity tracked by load lookahead is cleared at this time.

Figure 4B:
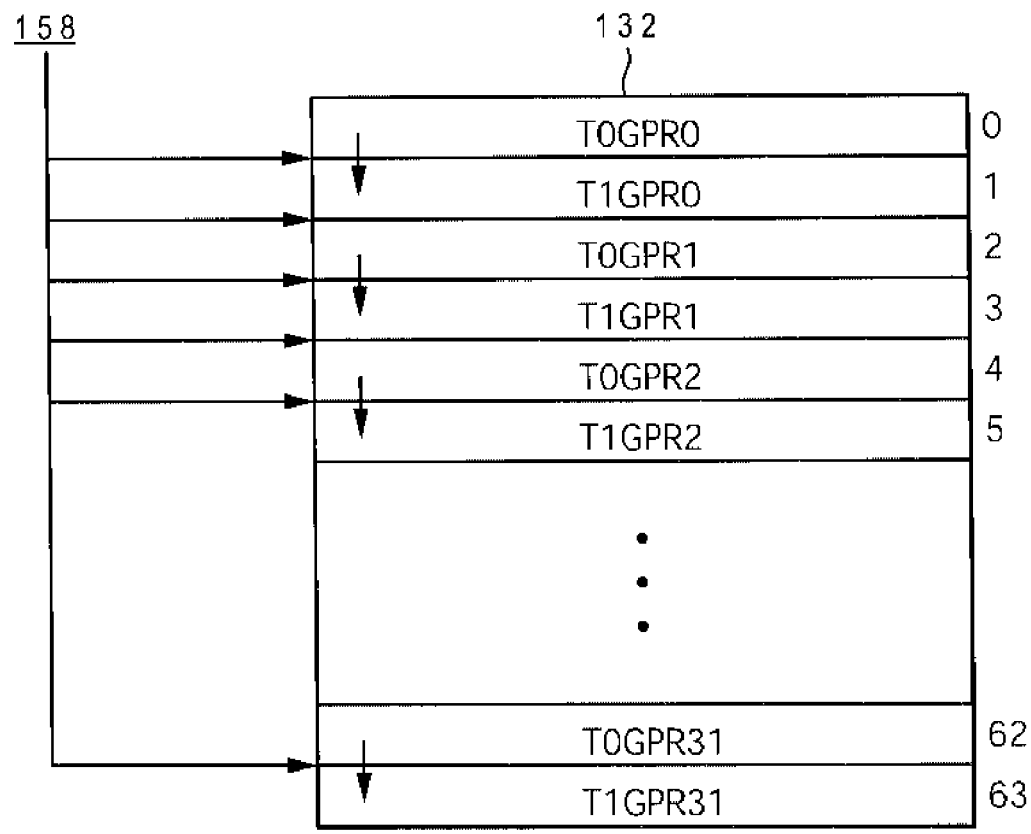
FIG. 4B is an exemplary general purpose register in accordance with an embodiment of the present invention.

Referring now to FIG. 4B, GPR 132 is implemented as a sixty-four entry register file. The GPR of two threads (an active thread and an inactive thread) are interleaved such that GPRs of thread 0 occupy the even entries of the register file and GPRs of thread 1 occupy the odd entries of the register file. When IDU 111 enables hardware-supported thread assist, one of the threads is in an inactive or "sleep mode". For example, thread 1 may be in an inactive mode while thread 0 remains active. Then a "copy_unconditional" signal 158 enables the copying of the contents of the architected registers for thread 0 to thread 1. In an embodiment of the present invention, "copy_unconditional" signal 158 may be sent from IDU 111 or activated by software. Then, during load lookahead prefetching, as instructions pass through the execution unit pipelines and the entire the writeback stage, results of the speculative execution of the instructions are written to the copy of the content of the architected registers in thread 1. In effect, thread 1 acts as a "scratchpad" for speculative results so that newer instructions dispatched from IDU 111 can also utilize the results of older instructions to prefetch needed information from system memory 106 until the stall condition that triggered the hardware-supported thread assist load lookahead prefetch has been resolved.

Figure 5:
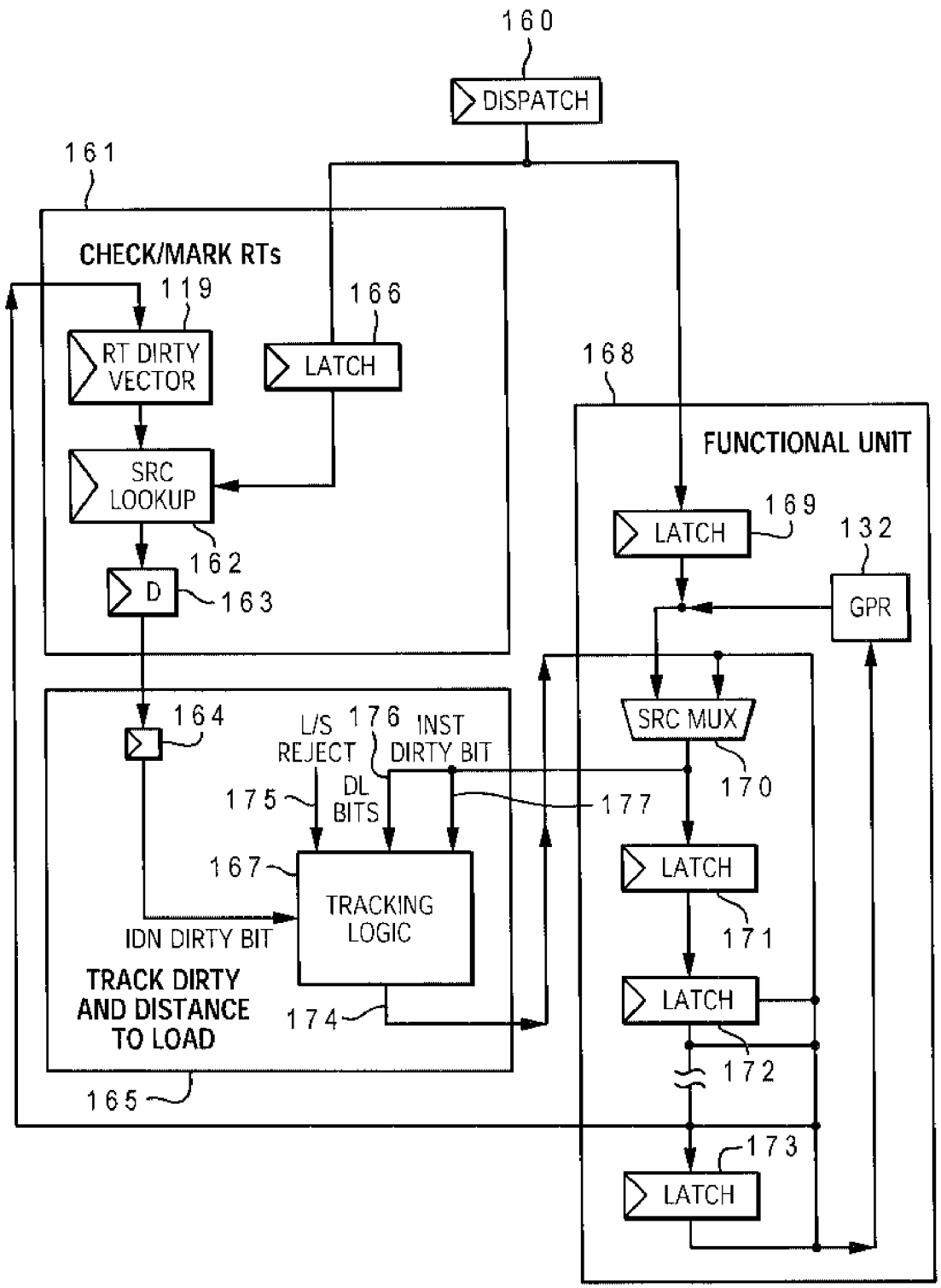
FIG. 5 is a block diagram of key load lookahead prefetch functions according to an embodiment of the present invention.

FIG. 5 is an overview of the present invention showing the various circuit elements used in the microprocessor (e.g., microprocessor 102a-102b) utilizing hardware-supported thread assist load lookahead prefetch according to an embodiment of the present invention. Microprocessor instructions ready for dispatch are held in dispatch latch 160. These instructions were provided to instruction buffer 121 in IDU 111 and have been processed by instruction sequencing logic prior to being received in latch 160. The instruction is then dispatched from latch 160 to its appropriate function unit 168, such as LSU, FPU, FXU or the like, and latched in by latch 169. Source lookup logic 162 within dirty bit logic 161 also receives the instruction via latch 166, and determines if the source registers contain invalid data. If so, a dirty bit value is provided to dirty bit latch 163. As noted above, the dirty bit will be provided along with the instruction to the various pipeline stages encountered during instruction processing. Dirty bit logic 161 will be described in greater detail in accordance with FIG. 6.

The dirty bit tracking and dependence on load (DL) logic 165 then receives the dirty bit from latch 163 and stores the dirty bit in latch 164. Those skilled in the art will appreciate how bits of data are latched across logic boundaries in order the keep the various processing elements in synchronization with each other.

Tracking logic 167 is also shown as part of dirty bit tracking and DL logic 165. Tracking logic 167 receives several inputs 175, 176, 177 and outputs a dirty bit signal on line 174 based on the state of the various inputs 175, 176, 177. The dirty bit from bit vector 119 is input to tracking logic 167 from IDU 111, via latch 164, which represents one of possibly several latches used by the present invention to ensure correct timing and synchronization. A signal 175 representing the reject status of a load instruction (i.e., whether the load data is valid) is also received by tracking logic 167. There are three criteria which will cause the dirty bit on line 174 to be set.

(1) Source data marked as "dirty" is forwarded from another instruction in functional unit 168 to tracking logic 170 via DL bits 176 and 177 (i.e., from mux 170);

(2) IDU 111 determines the source operand is dirty from the associated bit in dirty bit vector 119 and data is read from the GPR; and (3) Source data is read from a load that is later determined to be invalid (load reject) as received on input line 175 and the LSB of the DL bits is "1".

More particularly, when the data is determined to be "invalid", a reject signal is input at the appropriate time via line 174 to tracking logic 167 such that the dirty bit value is updated. Input lines 176, 177 provide the dirty bit and DL bits from source multiplexer 170. As noted above, the dirty bits and DL bits are forwarded with each instruction as the instruction progresses through the pipeline. Line 174 will provide these bits back to source multiplexer 170 after each stage.

As will be described in more detail below, the DL bits function as a shift counter with the number of bits being dependent on the cycles needed to validate the load data. The most significant bit (MSB) is initially set and then subsequently shifted as each pipeline stage is traversed. When the least significant bit (LSB) is set, then the determination of the validity of the load data is completed and it will be known whether a load reject has occurred. The operation and use of the DL bits will be described more fully below.

Functional unit 168 includes the pipeline stages commonly found in the vast majority of microprocessors, such as decode, execute (arithmetic and logic operations), writeback, and the like. Source multiplexer 170 receives input from GPR 132, from latches 171, 172, and 173 associated with each stage, and the dirty and DL bits from tracking logic 167 via line 174. It should be noted that line 174 in FIG. 5 represents multiple dirty bit signals, since tracking logic 167 needs an output from each stage to that stage's own bypass multiplexer.

The dirty and DL bits are then added to the instruction by source multiplexer 170 as the instruction enters the pipeline of functional unit 168. Adding the dirty and DL bits places the instruction in the format as shown in FIG. 4A. By way of example, but not limitation, latch 169 could be considered the "decode and read" stage, latches 171 and 172 could be considered execute stages, and latch 173 could be considered the writeback stage.

Figure 6:
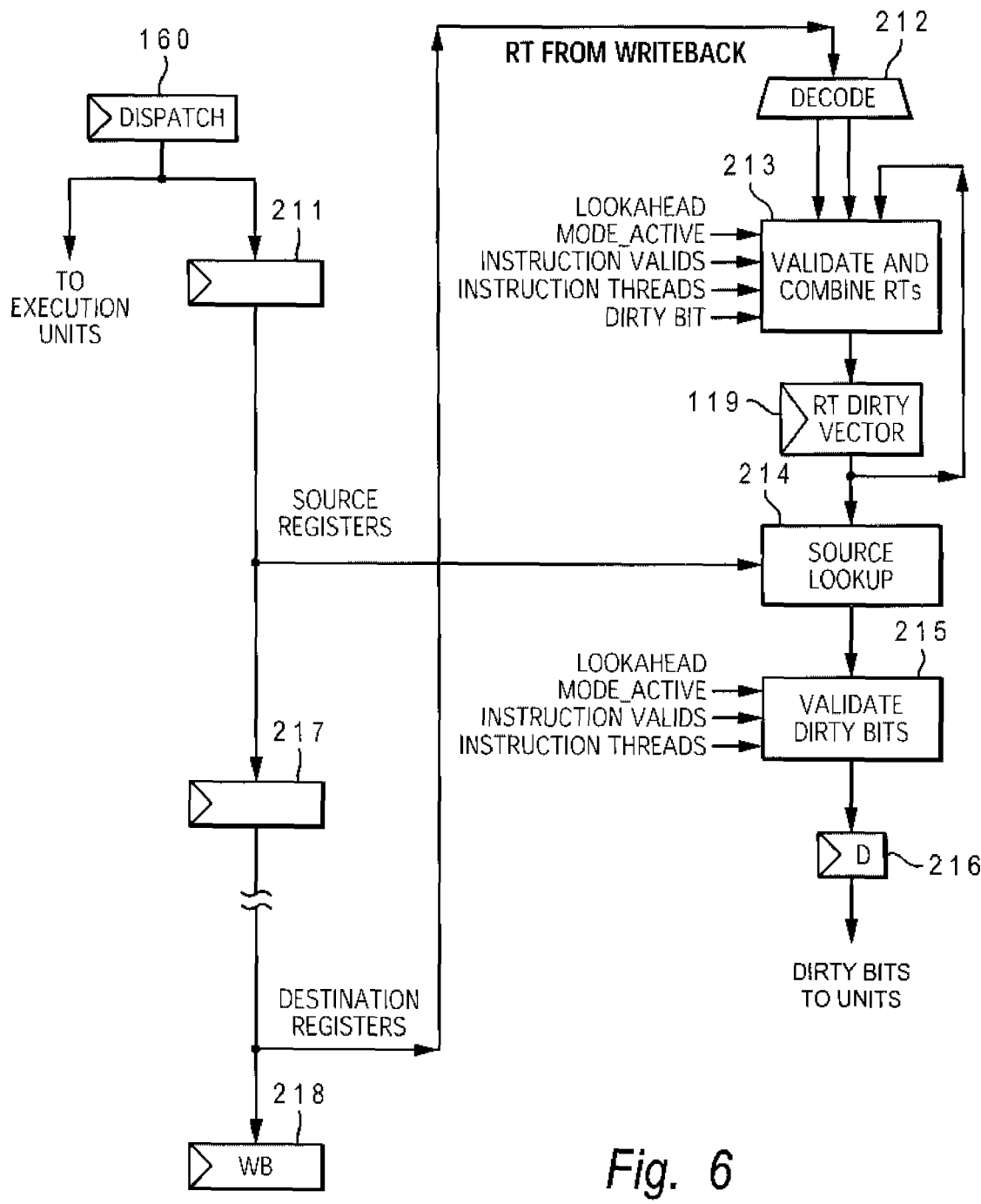
FIG. 6 is another more detailed block diagram that shows the checking and updating functions for the dirty bit vector in the instruction dispatch unit according to an embodiment of the present invention.

FIG. 6 shows the checking and updating functions associated with dirty vector 119 in IDU 111. More specifically, dirty bit vector 119 will be maintained to keep track of which results are no longer available for forwarding. The number of bits in dirty bit vector 119 is dependent on the number of architected registers present in the processor.

At dispatch time, every instruction will lookup the necessary source registers ($R_A$ and $R_B$) in dirty bit vector 119 to determine if any of the source registers are to be considered invalid. Other embodiments may lookup the dirty state of the register vector (or other architectural facility) at the time that the register is accessed. All of the bits in dirty bit vector 119 are initially set to "0" and these bits are set to "1" when a value contained in the corresponding register is determined to be invalid or "dirty". Source logic 162 looks up the dirty bits in dirty bit vector 119 for registers associated with the instructions being dispatched and a dirty bit is then forwarded to the function units via latch 216. The instruction dirty bit in functional unit 168 (FIG. 5), which is an indication that one or more data sources for an instruction are invalid, can be set in one of three ways:

(1) Source data is read from a forwarding path and that data is already marked dirty (dirty bit from an instruction in the pipeline is forwarded);

(2) IDU 111 (FIG. 1) indicates that a source operand is dirty based on a lookup in the dirty vector 119; or (3) Source data was read from a load that later determines the data is invalid and sends a reject signal (DL bits indicate that LSB is "1" and load reject occurs).

The dirty bit is forwarded along with results to any dependent instruction. If an instruction utilizes multiple sources, the dirty bits can simply be logically ORed together. That is, if an instruction is utilizing $R_A$ and $R_B$, then the dirty bits for these two registers are ORed and if one bit is set, then the data resulting for the execution of the instruction is considered invalid. LSU 128 will block cache access when a load with its dirty bit set is encountered.

As shown in FIG. 6, instructions ready for dispatch are stored in latch 160 and then provided to another latch 211, as well as to the execution units. Validate and combine target register logic 213, via decode 212, also receives instructions from the writeback stage subsequent to latch 217 and prior to the instruction being provided to writeback latch 218. Specifically, validate and combine target register logic 213 determines if the instruction associated with the target register is considered invalid and whether the result of that instruction should be marked dirty. Validate and combine target register logic 213 determines:

(1) If load lookahead prefetch mode is active;

(2) Whether the instruction is considered valid;

(3) Whether there are multiple threads in the processor and which thread is current (i.e., the dirty bit needs to be written to the dirty bit vector of the correct thread); and (4) Whether the register contains valid data based on the dirty bit coming from the execution unit.

If the four previous considerations are true, the dirty bit for that instruction is set. The instructions are provided to source lookup logic 214, which examines the source registers and utilizes dirty bit vector 119 to determine whether the data is valid.

A logical "1" will be associated with the instruction being processed when the source data is invalid and a "0" will be associated with the instructions if the source data is valid. Of course, these bit values are merely exemplary and other patterns are contemplated by the scope of the present invention to indicate the validity of the instruction data. Validate dirty bits logic 215 then validates the dirty bit by determining if lookahead mode is active, the instruction is valid and whether the correct thread is being utilized. The dirty bit is then provided to latch 216 to be subsequently supplied to the instruction in the execution unit. It can be seen that the instruction is initially provided to both the dirty bit logic and the execution units. Once the dirty bit logic determines the appropriate state of the bit, the state is supplied to the instruction as the instruction proceeds through the execution pipeline.

Figure 7:
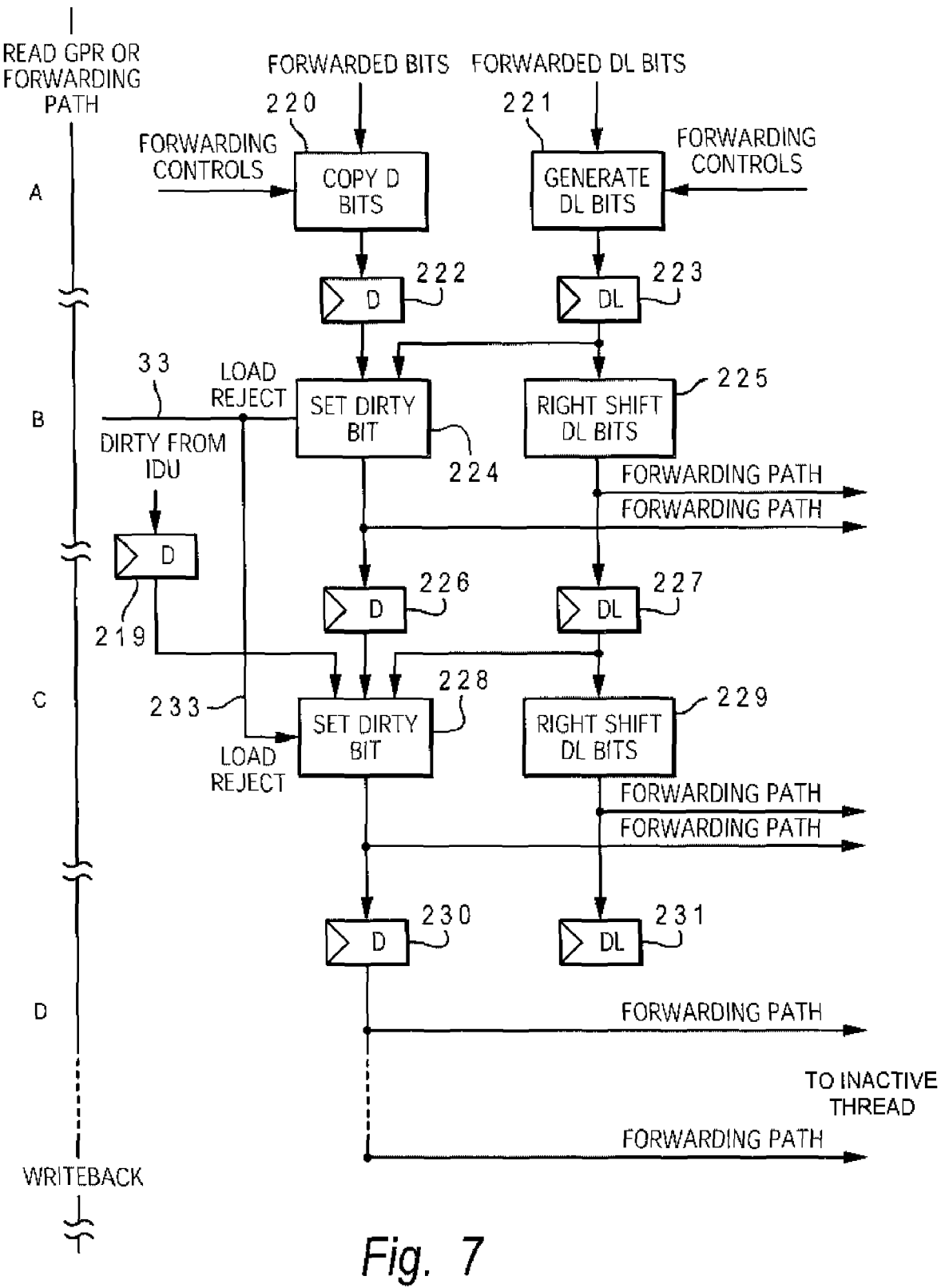
FIG. 7 is a block diagram that represents the tracking of the dirty bit and DL bits as they are maintained in the execution units according to an embodiment of the present invention.

FIG. 7 shows in greater detail the logic utilized in conjunction with the tracking of the dirty and DL bits. To improve performance, load/store units in one embodiment return load results before having determined if those results are actually valid. If the load results are determined not to be valid, a "reject" signal is provided to indicate this invalid state. If the state is determined to be "invalid", a situation is created where a newer, dependent instruction may have already utilized the returned load result as source data before that data is determined to actually be valid.

Dependence on load (DL) bits are utilized within the execution units to indicate the occurrence of such a condition. The DL bits function as a shift counter that counts down the time, in microprocessor cycles, between when a load instruction returns a result from memory and when the load instruction can send a reject signal, if the load data is determined to be invalid. In the case where the load data is determined to be valid, then no reject signal is sent and processing is allowed to continue. The length of the time window between the time when the load instruction returns a result from memory and when the load instruction can send a reject signal, and accordingly, the number of DL bits required is specific to the implementation of LSU 128 (FIG. 1). In the case of microprocessors having multiple LSUs, a set of DL bits must be maintained for each LSU. The DL bits are set whenever an instruction receives forwarded data from another instruction in the pipeline. The number of sets of DL bits will correspond to the number of LSUs present in the microprocessor. In this manner, the DL bits from a particular LSU will indicate the validity of load data for that particular LSU. Once an instruction has passed the latest point, in terms of cycles after the load result is received, where the instruction could be rejected, the DL bits are no longer needed.

In accordance with the present invention, the DL bits are set as follows:

(1) An instruction that utilizes the forwarded result of a load instruction as early as the result is available will set the MSB of the corresponding DL bits;

(2) An instruction that utilizes the forwarded result of a load instruction one cycle after the result is available will set the second MSB of the corresponding DL bits;

(3) An instruction that utilizes the forwarded result of a load instruction n cycles after the result is available will set the nth MSB of the corresponding DL bits; and (4) An instruction that utilizes a forwarded result of a non-load instruction will copy that instruction's DL bits.

The DL bits are then shifted every cycle. When a reject signal from an invalid load is encountered, the least significant DL bits of any dependent instruction will indicate that the dependent instruction depends on the rejected load. The dependent instruction can be marked, utilizing the dirty bit, as having invalid source data. If the instruction receives data from a load that has already passed the validation stage, then the instructions will get a dirty bit from the load at the time of the result bypass. Result data from a rejected load will be marked as dirty such that any dependent instruction that receives the result data via a forwarding path will identify the data as dirty.

Returning to FIG. 7, the instruction flow through the various logic and latches associated with four pipeline stages is shown. It should be noted that four stages are utilized merely as an example and any number of implementations having different stages are possible and are contemplated by the scope of the present invention. At stage A, a load instruction reads the data from the GPR or forwarding path and receives an indication of the status of the data (by forwarded dirty and DL bits). At this time, data read from the GPR is unknown to be valid or invalid. Also at stage A, logic 220 is utilized to copy the dirty bit associated with the instruction being executed from the output of a subsequent stage (stage B, C, or D in this example). This dirty bit may have been received from latch 216 in IDU 111 (FIG. 6) and placed into latch 219 before being provided to set dirty bit logic 228 in stage C.

It should be noted that a number of cycles must elapse before the dirty bit value to be supplied from IDU 111 to the execution units. Other embodiments may not have such a delay as the dirty bit may be kept with the data in a register file, or elsewhere in the vicinity of the execution units. The delay is the reason why the dirty bit is not provided until stage C. Additionally, conditions in the functional units (e.g., FXU) may cause the dirty bit to be set when the appropriate inputs are provided to set dirty bit logic 224 and 228. These conditions include the LSB of the DL set to "1" coupled with a load reject signal, or a forwarded dirty bit from an older instruction. Referring back to stage A, the dirty bit from logic 220 is then placed in latch 222. DL bit generation logic 221 receives the forwarded DL bits from a previous instruction and sets the bits in latch 223.

In stage B, set dirty bit logic 224 receives the dirty bit from latch 222 and DL bits from latch 223 as well as a reject signal from line 33. The least significant bit of the DL bits (variable A), from latch 223 is ANDed with the reject signal from line 33 (variable C). The result of the AND operation is then ORed with the dirty bit (variable B) to determine if the source registers associated with the instruction contain valid data. That is, the logical function (A AND C) OR B will determine whether the data is valid. As noted above, the DL bits function as a shift counter with the most significant bit originally set. The bit is then shifted until the bit reaches the LSB position, at which time, the load data is known as valid or invalid. Right shift logic 225 performs the shift counter function at stage B and right shifts the DL bits before sending the DL bits to latch 227 and forwarding the bits back to generation logic 221. The result of the above AND/OR operation is provided to latch 226, as well as logic 220.

Stage C performs the same essential functions as stage B. Latch 227 provides the DL bits to shifting logic 229 and dirty bit setting logic 228. Logic 228 ANDs the least significant DL bit (variable A) from latch 227 with the load reject signal from line 233 (variable C). The dirty bit from latch 226 (variable B) is then ORed with the result from the AND operation between the DL bit and the load reject, and the result is provided to dirty bit latch 230 and dirty bit copy logic 220. The resulting DL bits output from logic 229 are provided to latch 231 and also forwarded back to stage A and input to logic 221. The processing continues until the writeback stage D is encountered. The results from the instructions in the writeback stage are written to an inactive thread (e.g., thread 0 in FIG. 4B that holds a copy of the content of the architected registers).

Figure 8:
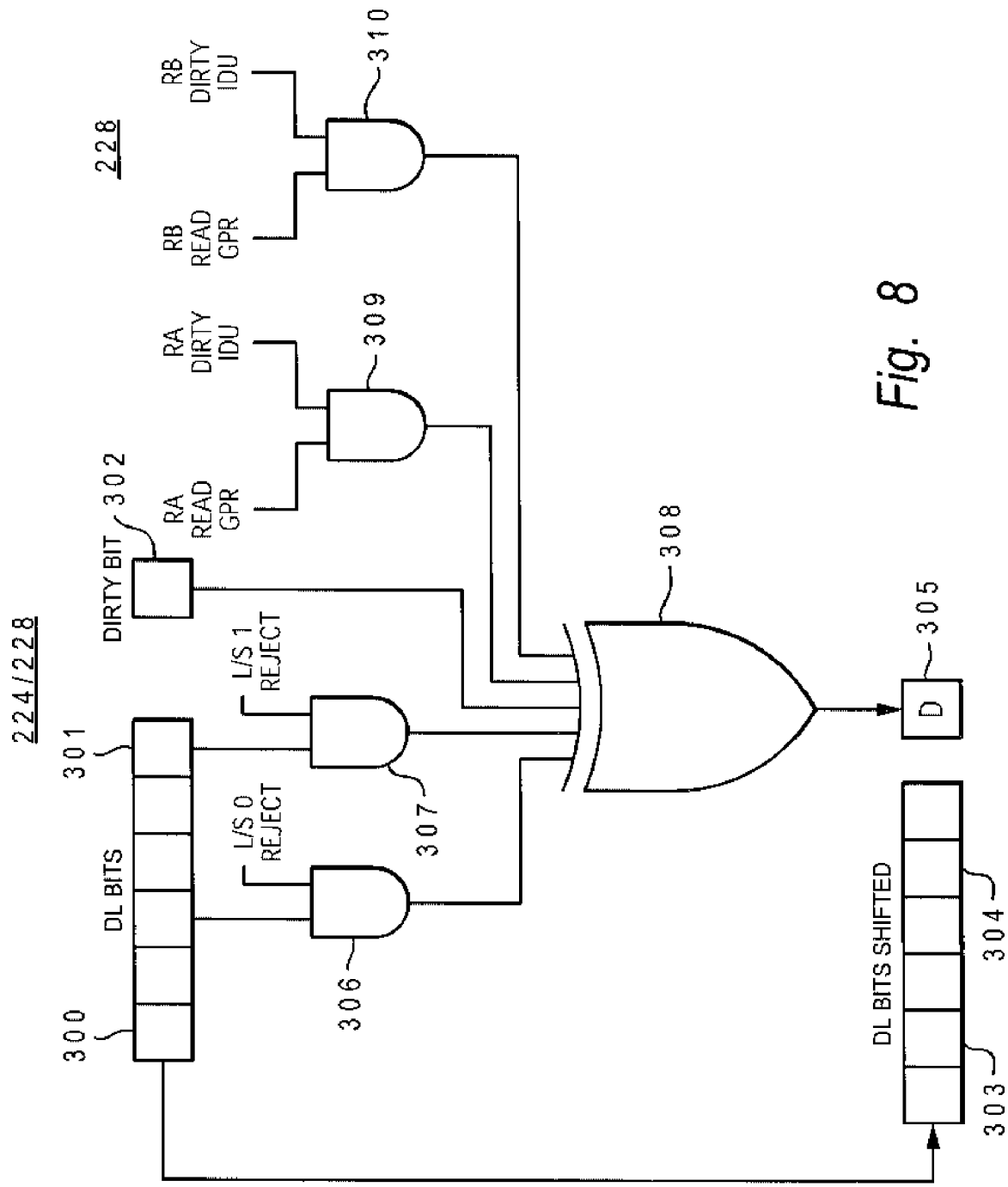
FIG. 8 is a logic diagram that illustrates the logical relationships between the dirty bit vector, execution unit dirty bit, DL bits, and load reject signals of the tracking function of FIG. 5.

FIG. 8 illustrates in more detail the logic implemented by the "set dirty bit" logic 224 and 228 of FIG. 7. In an embodiment of the present invention, two load/store units (L/S 0 and L/S 1) are present such that two sets of DL bits will be provided, one for each load/store unit. More particularly, the DL bits from a prior instruction are shown by reference numbers 300 and 301. LSB positions from DL fields 300 and 301, respectively, are coupled to AND gates 306 and 307, respectively. These AND gates also receive inputs indicating whether the load operations from L/S 0 and L/S 1 are rejected, i.e., whether the load data is invalid. As shown in FIG. 8, if the DL LSB is set to "1" and the loads are rejected (set="1"), then a "1" output is provided to OR gate 308. When loads are rejected for either load/store unit and the load data is not valid, then a "1" is provided from AND gates 306 and 307 to OR gate 308.

Further, a dirty bit 302 from dirty bit vector 119 corresponding to the register addresses from the instruction being executed is read and input to AND gates 309 and 310. For example, when an instruction utilizes registers $R_A$ and $R_B$, the associated dirty bit from dirty bit vector 119 is utilized as an input to AND gates 309 and 310. It is also determined whether the registers $R_A$ and $R_B$ are read from the register file (e.g., GPR for operations). It should be noted that the present invention contemplates any type of register file and a GPR is used herein only for purposes of explanation. If the registers used by the instructions are read from the register file (e.g., CPR), then a "1" is input along with the corresponding dirty bit value into AND gates 309 and 310, respectively. It can be seen that when the operand is read from the register (e.g., $R_A$) and the dirty bit corresponding to $R_A$ is set, then a logical "1" output is provided from AND gate 309 to OR gate 308. Similarly, when $R_B$ is read from the GPR and the corresponding dirty bit from dirty bit vector 119 in IDU 111 is set, then a logical "1" will also be provided to OR gate 308 from AND gate 310.

The outputs from AND gates 306, 307, 309, 310, along with the dirty bit 302 forwarded with result data, such as a source operand from any previous instruction are then ORed together. If any one of these inputs is true (e.g., set equal to "1"), then the dirty bit 305 is set and forwarded to a newer instruction in the pipeline. If none of the inputs to OR gate 308 are true, then the dirty bit is not forwarded and the DL bit in fields 303 and 304 are shifted to the right, since the dirty bit would not have been in the least significant bit position. In this manner, the present invention can track the status of the dirty bit for instructions proceeding through the pipeline stages of the microprocessor.

Figure 9:
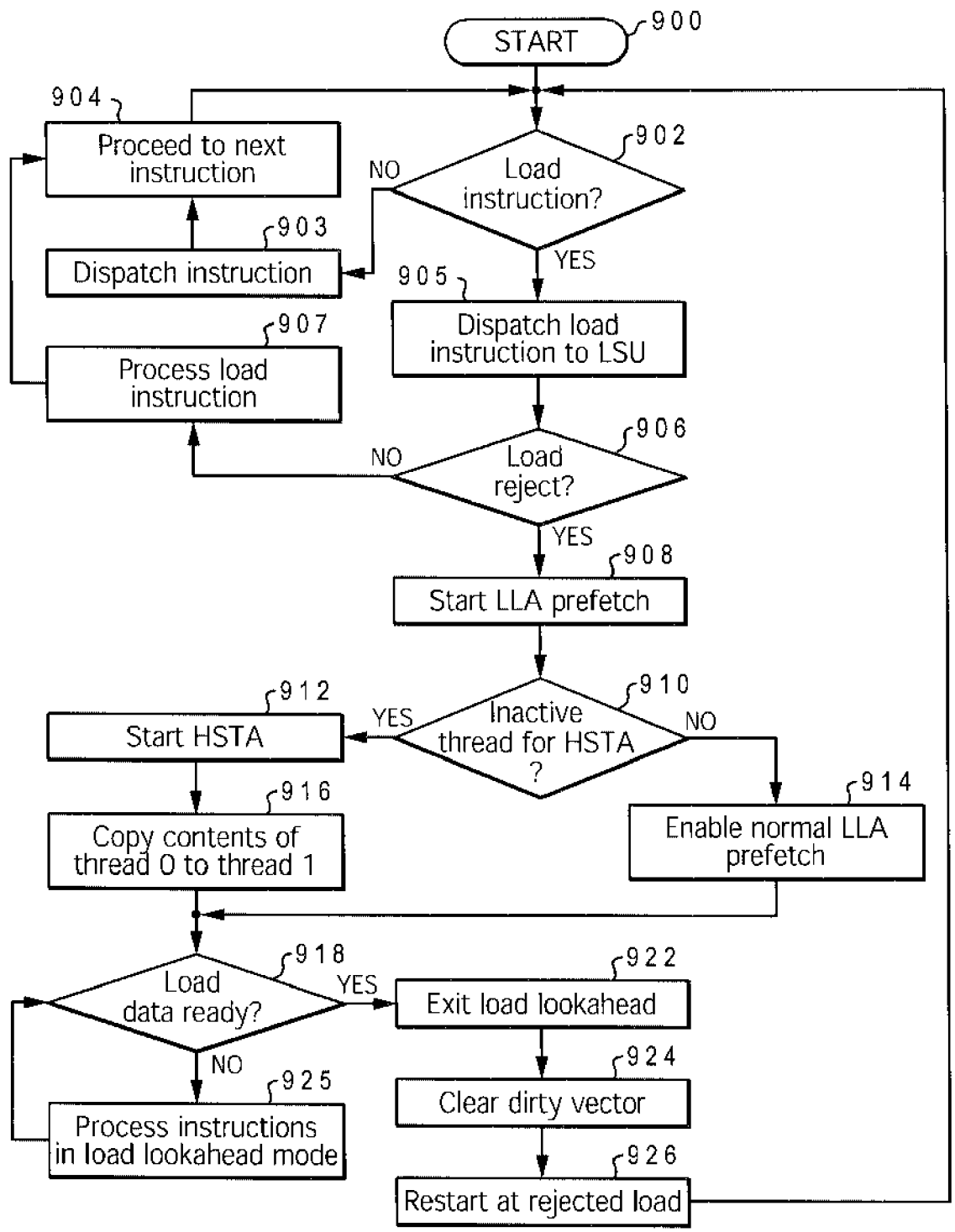
FIG. 9 is a high-level logical flowchart depicting an exemplary method for implementing hardware-supported thread assist for a load lookahead mechanism according to an embodiment of the present invention.

FIG. 9 is a high-level logical flowchart illustrating an exemplary method of implementing hardware-supported assist under load lookahead mechanism for a microprocessor according to an embodiment of the present invention.

The process begins at step 900 and proceeds to step 902, which depicts IDU 111 determining if the present instruction for dispatch is a load instruction. If the present instruction for dispatch is not a load instruction, the IDU 111 dispatches the instruction to the appropriate execution unit (e.g., FXU 122, FPU 130, etc.) and proceeds to the next instruction, as illustrated in steps 903 and 904. The process then returns to step 902.

Returning to step 904, if the present instruction is determined to be a load instruction, the process continues to step 905, which shows IDU 111 dispatching the load instruction to LSU 128. The process proceeds to step 906, which depicts LSU 128 determining whether a load reject condition has occurred.

As previously discussed, an example of a load reject condition is when an in-order execution microprocessor determines that load data is invalid, due to a cache miss, address translation table miss, or the like. The cache miss generally creates a stall condition since execution cannot proceed until the data becomes available. If there is no stall condition, LSU 128 processes the received load instruction, as illustrated in step 907, and the process continues to step 904, which illustrates IDU 111 examining the next received instruction. The process returns to step 902.

If a load reject condition has occurred, the process continues to step 908, which depicts IDU 111 initiating a load lookahead prefetch. The process proceeds to step 910, which determines if there is an inactive thread available to be used for hardware-supported thread assist. If there is such an inactive thread, the process proceeds to step 912, which illustrates the initiation of hardware-supported thread assist. Then, LSU 128 copies the content of the architected facility of the active thread (e.g., thread 0) to the corresponding facility of the inactive thread (e.g., thread 1), as shown in step 916. In an embodiment of the present invention, the aforementioned copying process is accomplished in one processor cycle. If there is not an inactive thread available in step 910, hardware-supported thread assist cannot be used and normal lookahead mode is enabled instead, as illustrated in step 914.

The process continues to step 918, which illustrates LSU 128 determining if the load data requested in step 902 is ready for processing. If the requested load data is not ready, the process continues to step 925, which depicts instructions being processed in load lookahead mode. This flow is described in more detail in FIG. 10 beginning with step 1000. The process returns to step 918 and continues in an iterative fashion.

At step 918, if the load data requested in step 902 is ready for processing, the process proceeds to step 922, which depicts LSU 128 exiting hardware-supported thread assist load lookahead prefetch mode. The process continues to step 924, which illustrates ISU 111 clearing dirty bit vector 119. The process proceeds to step 926, which shows LSU 922 non-speculatively executing the load instruction originally rejected in step 906. The process returns to step 902.

Those with skill in the art will appreciate that while an embodiment of the present invention includes load instructions that are sent to LSU 128 in a reduced instruction set computer (RISC) microprocessor, the system and method of hardware-supported thread assist load lookahead prefetch of the present invention may also load instructions sent to any functional unit (e.g., FXU, FPU, etc.) within any type of microprocessor, including, but not limited to a Complex Instruction Set Computer (CISC) microprocessor.

Figure 10B:
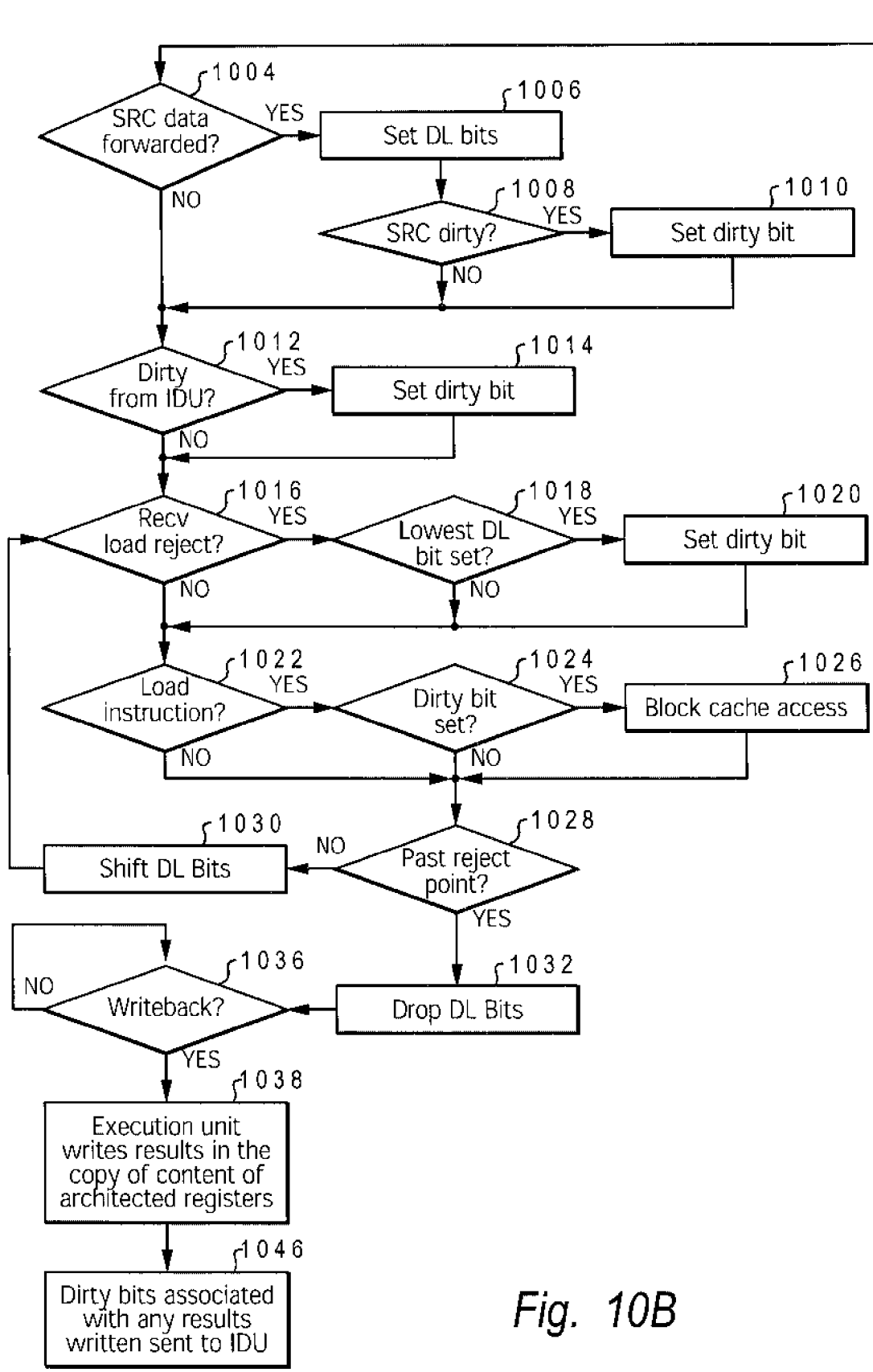
FIG. 10 is a high-level logical flowchart illustrating an exemplary method for implementing a load lookahead mechanism according to an embodiment of the present invention.

FIG. 10 is a high-level logical flowchart depicting an exemplary method of load lookahead prefetch according to an embodiment of the present invention. For ease of discussion, the left side of FIG. 10 generally depicts functions performed by the execution unit (e.g., LSU 128). The right side of FIG. 10 generally illustrates functions performed by IDU 111. The process begins at step 1000, and continues to step 1002, which illustrates IDU 111 dispatching an instruction to the appropriate execution unit. For example, IDU 111 will dispatch a load instruction to LSU 128. After the instruction is received, IDU 111 looks up the registers that are being called for at the data or operand sources for the instruction in dirty bit vector 119, as shown in step 1054. The process continues to step 1056, which illustrates IDU 111 determining whether the source data is dirty, by examining dirty bit vector 119.

If the dirty bits are set (indicating invalid data), the process continues to step 1058, which illustrates IDU 111 forwarding the dirty bits along with the instruction to the appropriate execution unit (e.g., LSU, FPU, FXU) for inclusion into the instruction. For example, with an ADD instruction, the target register ($R_t$) would be the register which will received the result of the addition of the values from the source registers and the dirty bit will be forwarded to a present instruction from a prior instruction that used the same target register but had invalid results.

After step 1058, the process continues to step 1034, which depicts the IDU 111 determining whether or not the instruction has reached the writeback stage. If the instruction has not yet reached the writeback stage within the execution unit, the process returns to step 1034 and proceeds in an iterative fashion until the writeback stage is reached. At this point, the process continues to step 1048 where the dirty bits associated with any results written are received by the IDU 111. These dirty bits are sent to the IDU 111 from the execution unit in step 1040. The process continues to step 1050, which illustrates IDU 111 using these dirty bits to determine if the result is valid. If a dirty bit is set and the result is not valid, then the corresponding entry in the dirty vector 119 is set in step 1052 and the process continues to step 1053. Otherwise, if the result is valid and there is no dirty bit set associated with that result, then the process continues to step 1053, which shows the IDU 111 determining if the hardware-supported thread assist load lookahead prefetch mode should be exited. As previously discussed, the hardware-supported thread assist load lookahead prefetch mode is exited when the stall condition that started the mode is resolved. If the mode should be exited, the process ends, as illustrated in step 1060. If the mode should not be exited, the process returns to step 1002.

Parallel with step 1054, after IDU 111 dispatches the instruction, the process continues to step 1004, which illustrates the execution unit determining whether the source data is forwarded from a prior instruction. If the source data is provided from the forwarding path, then the process continues to step 1006, which depicts DL bits being set, i.e., the DL bits are initialized to, for example, 100, when three cycles are required to determine the validity of the load data. The process proceeds to step 1008, which shows the execution unit determining if the source registers are dirty (a dirty bit was forwarded). If a dirty bit was forwarded, the process continues to step 1010, which illustrates the dirty bit being set for the present instructions (i.e., the dirty bits are forwarded to more recent instructions). The process then continues to step 1012. If the source registers are not dirty, the process continues directly to step 1012.

Returning to step 1004, if source data is not forwarded from a prior instruction, the source data is read from a general purpose register (e.g., GPR 132 in FIG. 1) and the process continues to step 1012, which illustrates the execution unit determining if the source data read from the copy of the architected registers located in the inactive thread (steps 910-914 of FIG. 9) is dirty with the help of the dirty bits sent from the IDU 111 in step 1058. If the source data is dirty, the execution unit sets dirty bit field 152 (FIGS. 3 and 4A) within the instruction, as illustrated in step 1014. The process continues to step 1016.

Step 1016 illustrates a determination made by the execution unit executing the instruction whether a load reject signal has been received from LSU 128. As previously described, the load reject signal indicates that data loaded from the cache is invalid. If the execution unit has received a load reject signal from LSU 128, the process continues to step 1018, which depicts the execution unit determining if the lowest DL bit 151 is set. If so, the dirty bit field 152 within the instruction is set by the execution unit, as shown in step 1020. When the LSB of the DL bits is set, the dependency between the instructions in the pipeline is known. The dirty bit can be set when the data reject signal for a corresponding load instruction is also known. The process continues to step 1022.

In step 1022, if the instruction is a load instruction, the process continues to step 1024, which depicts the execution unit determining if the dirty bit field 152 in the instruction is set. If so, LSU 128 blocks access to the cache in step 1026 (e.g., L1 data cache and MMU 116), preventing invalid data that was retrieved using dirty source operands from being written.

If the instruction is not a load instruction or the dirty bit is not set, the process continues to step 1028, which illustrates the execution unit determining if the point in time where a load reject is past. This point varies by implementation but in this embodiment is the time when the data valid is returned from LSU 128, indication that the data returned at an earlier point in time from a cache access is in fact valid. If not, the process continues to step 1030, which depicts the execution unit shifting the DL bit s150 and 151 (FIGS. 3 and 4*a*), to continue to track the validity of instruction being processed by the execution unit. After this shifting occurs, the process returns to step 1016 to once again wait for a reject signal. This cycle repeats until the data valid is returned from LSU 128 and there can no longer be a reject signal. If the time where a load can reject is past, the process proceeds to step 1032, which shows the execution unit dropping the DL bits 150 and 151 (FIG. 3 and FIG. 4A), because there is no longer a need to track the progress of the instruction relative to the validity of the target and source registers.

After step 1032, the process continues to step 1036, which determines if the instruction has reached the writeback stage. If the instruction has not yet reached the writeback stage within the execution unit, the process returns to step 1036 and proceeds in an iterative fashion until the writeback stage is reached. Once the writeback stage has been reached, the process continues to step 1038, which illustrates the execution unit writing the results in the copy of the content of the architected registers located in an inactive thread (e.g., thread 1, as depicted in FIG. 9). Finally, continuing to step 1040, the value of dirty bit field 148 is sent to the IDU 111 where it is received by step 1048.

As discussed, the present invention includes a system and method for implementing a hardware-supported thread assist under load lookahead mechanism for a microprocessor. According to an embodiment of the present invention, hardware thread-assist mode can be activated when one thread of the microprocessor is in a sleep mode. When load lookahead mode is activated, the fixed point unit copies the content of one or more architected facilities from an active thread to corresponding architected facilities in the first inactive thread. The load-store unit performs at least one speculative load in load lookahead mode and writes the results of the at least one speculative load to a duplicated architected facility in the first inactive thread.

It should be understood that at least some aspects of the present invention may alternatively be implemented in a computer-usable medium that contains a program product. Programs defining functions in the present invention can be delivered to a data storage system or a computer system via a variety of signal-bearing media, which include, without limitation, non-writable storage media (e.g., CD-ROM), writable storage media (e.g., hard disk drive, read/write CD-ROM, optical media), system memory such as, but not limited to random access memory (RAM), and communication media, such as computer and telephone networks including Ethernet, the Internet, wireless networks, and like network systems. It should be understood, therefore, that such signal-bearing media when carrying or encoding computer-readable instructions that direct method functions in the present invention represent alternative embodiments of the present invention. Further, it is understood that the present invention may be implemented by a system having means in the form of hardware, software, or a combination of software and hardware as described herein or their equivalent.

While the present invention has been particularly shown and described with reference to a preferred embodiment, it will be understood by those skilled in the art that various changes in form and detail may be made therein without departing from the spirit and scope of the invention.

What is claimed is:

1. A computer-implementable method for improved data processing in a data processing system, said computer-implementable method comprising:
   when a load lookahead mode is activated, determining if a first thread has entered into a sleep mode to become an inactive first thread;
   when a first thread enters a sleep mode, activating a hardware thread-assist mode;
   copying content of a second architected facility from an active second thread to a corresponding first architected facility in said inactive first thread;
   performing at least one speculative load in said load lookahead mode; and
   writing results of said at least one speculative load to said first architected facility in said inactive first thread.

2. The computer-implementable method according to claim 1, wherein said copying further comprises:
   copying said content in one processing cycle.

3. The computer-implementable method according to claim 1, wherein said copying further comprises:
   interleaving contents of said first architected facility and said second architected facility in said inactive first thread.

4. The computer-implementable method according to claim 1, wherein said load lookahead mode is activated in response to processing an instruction that results in an instruction stall.

5. The computer-implementable method according to claim 4, further comprising:
   if said first thread has not entered into said sleep mode, processing instructions subsequent to said instruction stall without saving results of said processing to said first architected facility.

6. The computer-implementable method according to claim 4, further comprising:
   in response to resolving said instruction stall, restarting processing at said instruction that resulted in said instruction stall.

7. A system, comprising:
   a system memory; and
   a plurality of processors coupled to said system memory, wherein at least one of said plurality of processors is configured for:
   when a load lookahead mode is activated, determining if a first thread has entered into a sleep mode to become an inactive first thread;
   when a first thread enters a sleep mode, activating a hardware thread-assist mode;
   copying content of a second architected facility from an active second thread to a corresponding first architected facility in said inactive first thread;
   performing at least one speculative load in said load lookahead mode; and
   writing results of said at least one speculative load to said first architected facility in said inactive first thread.

8. The system according to claim 7, wherein said copying further includes copying said content in one processing cycle.

9. The system according to claim 7, wherein said copying further includes interleaving contents of said first architected facility and said second architected facility in said inactive first thread.

10. The system according to claim 7, wherein said load lookahead mode is activated in response to processing an instruction that results in an instruction stall.

11. The system according to claim 10, wherein said said at least one processor is further configured for:
    if said first thread has not entered into said sleep mode, processing instructions subsequent to said instruction stall without saving results of said processing to said first architected facility.

12. The system according to claim 10, wherein said said at least one processor is further configured for:
    in response to resolving said instruction stall, restarting processing at said instruction that resulted in said instruction stall.

13. A computer-usable storage medium embodying computer program code for implementing a hardware-supported thread assist under load lookahead mechanism for a plurality of processors, said computer-usable storage medium comprising:
    program code for, when a load lookahead mode is activated, determining if a first thread has entered into a sleep mode to become an inactive first thread;
    program code for, when a first thread enters a sleep mode, activating a hardware thread-assist mode;
    program code for copying content of a second architected facility from an active second thread to a corresponding first architected facility in said inactive first thread;
    program code for performing at least one speculative load in said load lookahead mode; and
    program code for writing results of said at least one speculative load to said first architected facility in said inactive first thread.

14. The computer-usable storage medium according to claim 13, wherein said program code for copying further comprises program code for:
    copying said content in one processing cycle.

15. The computer-usable storage medium according to claim 13, wherein said program code for copying further comprises program code for:

interleaving contents of said first architected facility and said second architected facility in said inactive first thread.

16. The computer-usable storage medium according to claim 13, wherein said load lookahead mode is activated in response to processing an instruction that results in an instruction stall.

17. The computer-usable storage medium according to claim 16, wherein said computer-usable storage medium further comprises program code for:

if said first thread has not entered into said sleep mode, processing instructions subsequent to said instruction stall without saving results of said processing to said first architected facility.

18. The computer-usable storage medium according to claim 16, wherein said computer-usable storage medium further comprises program code for:

in response to resolving said instruction stall, restarting processing at said instruction that resulted in said instruction stall.

\* \* \* \* \*